(12) United States Patent
Lin et al.

(10) Patent No.: US 7,871,592 B2
(45) Date of Patent: Jan. 18, 2011

(54) METHOD FOR PREPARING A CARBON/CARBON COMPOSITE

(75) Inventors: Jiin-Huey Chern Lin, 911 Tower Rd., Winnetka, IL (US) 60093; Chien-Ping Ju, Kansas City, MO (US); Hua-Hsuan Kuo, Chiayi (TW); Shu-Ching Ho, Tainan (TW); Seng-Meng Chen, Yunlin County (TW)

(73) Assignee: Jiin-Huey Chern Lin (US)

( * ) Notice: Subject to any disclaimer, the term of this patent is extended or adjusted under 35 U.S.C. 154(b) by 722 days.

(21) Appl. No.: 11/794,102

(22) PCT Filed: Dec. 27, 2005

(86) PCT No.: PCT/US2005/047015

§ 371 (c)(1),
(2), (4) Date: Jun. 25, 2007

(87) PCT Pub. No.: WO2006/071847

PCT Pub. Date: Jul. 6, 2006

(65) Prior Publication Data

US 2008/0025906 A1 Jan. 31, 2008

(30) Foreign Application Priority Data

Dec. 27, 2004 (CN) .......................... 2004 1 0102493

(51) Int. Cl.
*C01B 31/04* (2006.01)
*C01B 31/00* (2006.01)

(52) U.S. Cl. ................ 423/448; 423/445 R; 423/449.6; 264/29.1; 264/101; 977/742

(58) Field of Classification Search ................. 423/448, 423/445 R, 449.6; 264/29.1, 101; 977/742
See application file for complete search history.

(56) References Cited

U.S. PATENT DOCUMENTS 5,057,254 A * 10/1991 Sohda et al. ................ 264/29.2
2004/0155382 A1 * 8/2004 Huang et al. ................ 264/450

* cited by examiner

*Primary Examiner*—Michael M Bernshteyn
(74) *Attorney, Agent, or Firm*—Bacon & Thomas, PLLC

(57) ABSTRACT

A method for preparing a carbon/carbon (C/C) composite comprising carbonizing a carbon fiber-reinforced polymer matrix composite precursor by heating the precursor in an inert atmosphere with a heating rate greater than 20° C./min up to 1500° C./min.

34 Claims, 1 Drawing Sheet ically dependent on a careful control of its carbonization process due to the fact that carbonization is one of the most time and energy-consuming steps in the entire fabrication process of C/C composites, especially for those densified by liquid phases.

METHOD FOR PREPARING A CARBON/CARBON COMPOSITE

FIELD OF THE INVENTION

The present invention is related to a method for preparing carbon/carbon (C/C) composite, and in particular to a method for preparing carbon/carbon (C/C) composite by fast carbonization.

BACKGROUND OF THE INVENTION

Carbonization plays an important role in preparing a carbon/carbon (C/C) composite. Not only the properties, the economical efficacy of a C/C composite is critically dependent on a careful control of its carbonization process due to the fact that carbonization is one of the most time and energy-consuming steps in the entire fabrication process of C/C composites, especially for those densified by liquid phases.

Logically the simplest way to reduce the manufacturing cost of C/C composites is to increase the carbonization rate, which is usually very low. However, carbonization is primarily a process of pyrolysis of hydrocarbons of a carbon precursor. The pyrolysis of hydrocarbons generally involves such processes as the cleavage of C—H and C—C bonds to form reactive free radicals, molecular rearrangement, thermal polymerization, aromatic condensation and elimination of side chains (e.g., $H_2$) [Lewis, 1982; Lauševic and Marinkovic, 1986][12, 9]. To minimize such adverse effects as shrinkage, cracking and thermal stresses that may build up during carbonization, low carbonization/heating rates (<20° C./min) are usually required [Olsen et al., 1997; Sastri et al, 1999, Ko and Chen, 1991; Roy, 1993; Chang et al., 1994; Gupta and Harrison, 1994; Prevorsek and Li, 1996; Lewis and Howard, 1997; Hager et al., 2000; Murdie et al., 2000][18, 21, 8, 20, 1, 4, 19, 11, 6, 15].

Ko and Chen [Ko and Chen, 1991][8] studied the pyrolysis of a plane-woven PAN (polyacrylonitrile)-based carbon fabric/phenolic resin composite, and observed that in their heating rate range (0.1-5° C./min), the heating rates below 3° C./min had no effect on the carbon yield of the composite carbonized to 1000° C. Roy [Roy, 1993][20] found that in the heating rate range of 0.03-0.8° C./min, the interlaminar tensile strength of their 8H satin woven PAN-based UHM carbon fabric/phenolic resin composite was not affected by the heating rate. Chang et al. [Chang et al., 1994][1] revealed that in the range of 0.5-3° C./min, the density and flexural strength of their plane-woven PAN-based carbon fabric/phenolic resin composite declined by 0.7% and 6.6% respectively, when a higher heating rate was used. The weight loss and flexural modulus were not affected. In their research on an 8H satin woven PAN-based carbon fabric/phenolic resin composite carbonized to 1000° C. at a heating rate of 2-7° C./min, Nam and Seferis [Nam and Seferis, 1992][17] discovered that a higher heating rate and a larger thickness of the composite resulted in a larger temperature gradient within the composite. This temperature gradient could result in a non-uniform carbonization, creating internal stresses through the laminates, which in turn, might lead to localized delamination and/or other damages to the char structure of the matrix.

SUMMARY OF THE INVENTION

The present invention discloses a method for preparing carbon/carbon (C/C) composite, which uses a heating rate of 20° C./min to 1500° C./min during carbonization of a carbon fiber-reinforced polymer matrix composite precursor. It is surprising to people skilled in the art that a C/C composite can be successfully prepared with this high heating rate of the present invention, i.e. disintegration does not occur during the fast carbonization process, and that the final C/C composite prepared according to the method of the present invention has comparable mechanical properties, and an acceptable tribological performance, which can also be improved with a post-treatment disclosed in the present invention.

Preferred embodiments of the present invention include (but not limited to) the following items:

1. A method for preparing a carbon/carbon (C/C) composite comprising carbonizing a carbon fiber-reinforced polymer matrix composite precursor by heating the precursor in an inert atmosphere at a temperature of 500-2000° C. with a heating rate greater than 20° C./min.
2. The method as set forth in Item 1, wherein the heating rate is greater than 100° C./min.
3. The method as set forth in Item 1, wherein the heating rate is of 300-1500° C./min.
4. The method as set forth in Items 2 or 3 wherein the heating is carried out by using an open-end induction furnace, and wherein said precursor is continually or intermittently brought in and out said furnace.
5. The method as set forth in Items 2 or 3, wherein the precursor is a cured carbon fiber-reinforced polymer matrix composite having a thickness less than 3.0 cm.
6. The method as set forth in Item 5, wherein the precursor is a cured carbon fiber-reinforced polymer matrix composite having a thickness less than 2.0 cm.
7. The method as set forth in Item 5, wherein the precursor is a cured carbon fiber-reinforced polymer matrix composite prepared from randomly oriented carbon fibers having a length greater than 3.0 mm and shorter than a length of the precursor.
8. The method as set forth in Item 7, wherein the randomly oriented carbon fibers having a length shorter than 30% of the length of the precursor.
9. The method as set forth in Item 5, wherein the precursor is a cured carbon fiber-reinforced polymer matrix composite prepared from a two-dimensional woven carbon fiber cloth, two-dimensional random fiber mat or a three-dimensional woven fiber preform.
10. The method as set forth in Item 5, wherein the precursor is a cured carbon fiber-reinforced polymer matrix having 20-80 vol % of carbon fibers based on the volume of the cured carbon fiber-reinforced polymer matrix.
11. The method as set forth in Item 10, wherein the cured carbon fiber-reinforced polymer matrix has 30-70 vol % of carbon fibers.
12. The method as set forth in Item 1 further comprising a first graphitization comprising heating the resulting carbonized composite in an inert atmosphere at a temperature higher than 2000° C.
13. The method as set forth in Item 12 further comprising densifying the resulting first graphitized composite by repeating one or more cycles of impregnating the first graphitized composite with a resin; curing the resin; and carbonizing the cured resin in the first graphitized composite.
14. The method as set forth in Item 1 further comprising densifying the resulting carbonized composite by repeating one or more cycles of impregnating the carbonized composite with a resin; curing the resin; and carbonizing the cured resin in the carbonized composite.
15. The method as set forth in Items 13 or 14 further comprising a second graphitization comprising heating the resulting densified composite in an inert atmosphere at a temperature higher than 2000° C.

16. The method as set forth in Item 15 further comprising subjecting the resulting second graphitized composite to a post-treatment comprising impregnating the second graphitized composite with a resin; curing the resin; carbonizing the cured resin in the second graphitized composite; and optionally graphitizing the carbonized second graphitized composite at a temperature higher than 2000° C.

17. The method as set forth in Items 13 or 14, wherein said carbonizing in said densifying is carried out in an inert atmosphere and with a heating rate greater than 20° C./min, preferably greater than 100° C./min.

18. The method as set forth in Item 16, wherein said carbonizing in said post-treatment is carried out in an inert atmosphere and with a heating rate greater than 20° C./min, preferably greater than 100° C./min.

19. The method as set forth in Item 1, wherein said carbon fiber is selected from the group consisting of polyacrylonitrile (PAN)-derived carbon fiber, pitch-derived carbon fiber and rayon-derived carbon fiber.

20. The method as set forth in Item 1, wherein said polymer is a thermosetting polymer or a thermoplastic polymer.

21. The method as set forth in Item 20, wherein said thermosetting polymer is selected from the group consisting of phenolic resin, furfural alcohol resin and polyimide.

22. The method as set forth in Item 20, wherein said thermoplastic polymer is selected from the group consisting of petroleum pitch, coal tar pitch, mesophase pitch and polyetheretherketone (PEEK).

23. The method as set forth in Item 1, wherein said polymer is doped with a carbon-containing viscosity-modifying component selected from the group consisting of graphite, carbon black, mesophase pitch, carbon nanoparticle, carbon nanotube, and carbide.

24. The method as set forth in Item 16, wherein said resin used in said post-treatment is a phenolic resin, a furfural alcohol resin, a petroleum pitch, a coal tar pitch or a mesophase pitch.

25. The method as set forth in Items 13 or 14, wherein said resin used in said densifying is doped with a carbon-containing additive.

26. The method as set forth in Item 25, wherein said carbon-containing additive is in an amount of 1-30% based on the weight of the resin.

27. The method as set forth in Item 25, wherein said carbon-containing additive is selected from the group consisting of graphite, carbon black, mesophase pitch, carbon nanoparticle, carbon nanotube, and carbide.

28. The method as set forth in Item 16, wherein said resin used in said post-treatment is doped with a carbon-containing additive.

29. The method as set forth in Item 28, wherein said carbon-containing additive is in an amount of 1-30% based on the weight of the resin.

30. The method as set forth in Item 28, wherein said carbon-containing additive is selected from the group consisting of graphite, carbon black, mesophase pitch, carbon nanoparticle, carbon nanotube, and carbide.

31. A method for enhancing mechanical and tribological properties of a carbon/carbon (C/C) composite comprising impregnating a C/C composite with a resin; curing the resulting impregnated composite; and carbonizing the resulting cured composite by heating the cured composite in an inert atmosphere; and optionally graphitizing the resulting carbonized composite by heating in an inert atmosphere at a temperature higher than 2000° C.

32. The method as set forth in Item 31, wherein said carbonizing is carried out in an inert atmosphere and with a heating rate greater than 20° C./min, preferably greater than 100° C./min.

33. The method as set forth in Item 32, wherein said carbonizing is carried out with a heating rate of 300-1500° C./min.

34. The method as set forth in Items 32 or 33, wherein said carbonizing is carried out by using an open-end induction furnace, wherein said cured composite is continually or intermittently brought in and out said furnace.

35. The method as set forth in Item 31, wherein said resin is a phenolic resin, a furfural alcohol resin, a petroleum pitch, a coal tar pitch or a mesophase pitch.

36. The method as set forth in Item 31, wherein said resin used in said post-treatment is doped with a carbon-containing additive.

37. The method as set forth in Item 36, wherein said carbon-containing additive is selected from the group consisting of graphite, carbon black, mesophase pitch, carbon nanoparticle, carbon nanotube, and carbide.

38. The method as set forth in Item 30, wherein said carbon-containing additive is in an amount of 1-30% based on the weight of the resin.

DETAILED DESCRIPTION OF THE INVENTION

Figure 1:
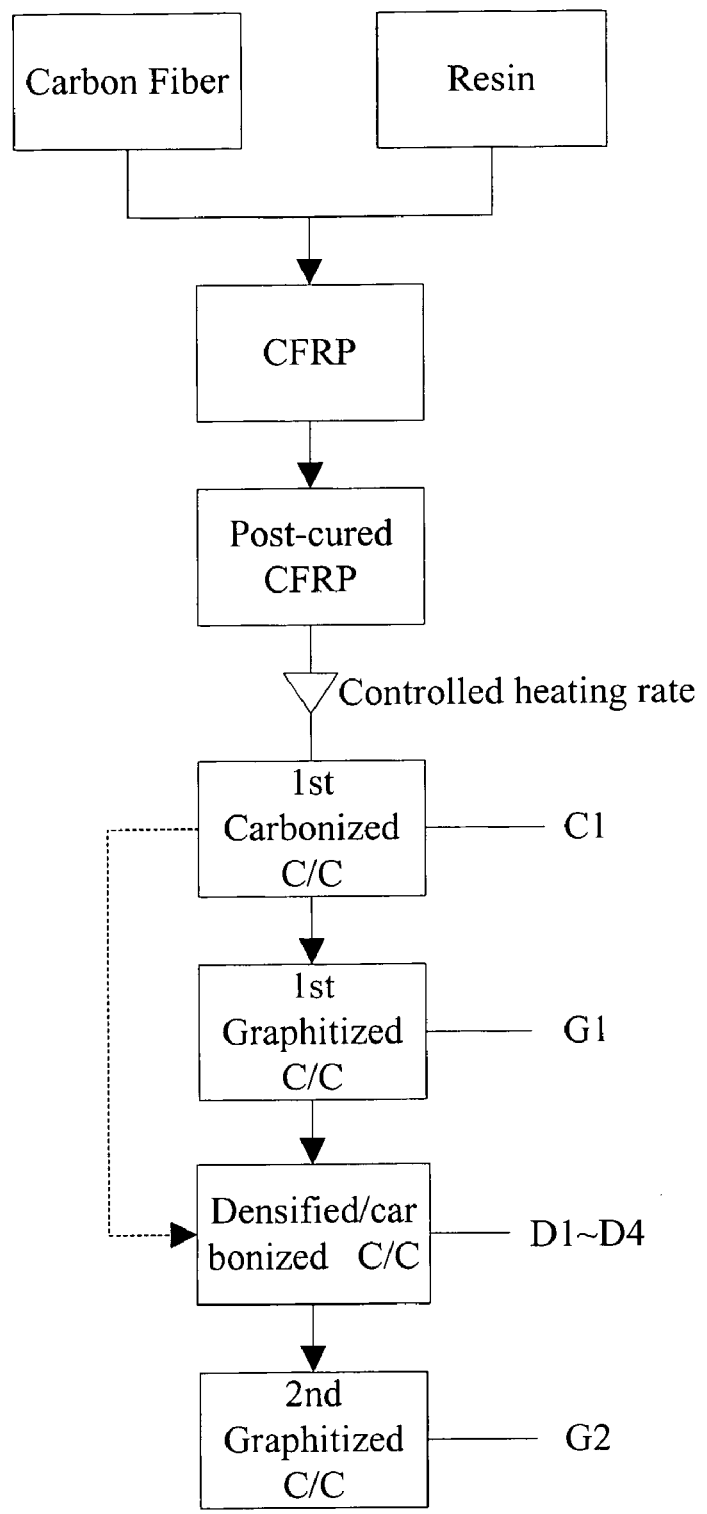
FIG. 1 shows a flowchart for fabrication processes of C/C composites and their codes for different process stages, wherein the codes for the first carbonization, the first graphitization, four cycles of densification, and the second graphitized stages were C1, G1, D1~D4, and G2, respectively.

Unlike all above-mentioned studies in the Background of the Invention using carbonization rates lower than 20° C./min, the present inventors have taken a "quantum leap" in dramatically increasing the carbonization rate up to 1000° C./min. Surprisingly it was found that the bending properties of the C/C composite prepared with a carbonization rate higher than 100° C./min were comparable to that of the C/C composite prepared with a carbonization rate of 1° C./min. Furthermore, the composite carbonized at a rate higher than 100° C./min had significantly higher fracture energy than that carbonized at lower rates. This dramatic increase in carbonization rate is greatly beneficial to the C/C industry from an economic point of view.

On the other hand, the same inventors found that the tribological performance (particularly wear) of the inventive fast-carbonized (1000° C./min) composite was inferior to that prepared with lower carbonization rates. It seems that fast carbonization-induced increased wear rate becomes a disadvantage when the fast-carbonized C/C composites are to be used as a friction material. Fortunately this problem was solved in the present invention. To be specific, the tribological performance of the fast-carbonized C/C composite was largely improved by an inventive method comprising applying to the composite, after graphitization of the composite, an additional cycle of impregnation, curing, carbonization and graphitization (termed "post-treatment"). Furthermore, in this post-treatment, two different liquid precursors (furan resin and coal tar pitch) and three different additives (carbon black, graphite powder and mesophase pitch) doped in the liquid precursors were used. This post-treatment can also be used to improve tribological properties of commercial C/C composites.

Except the extraordinary high heating rate in the first carbonization, the method for preparing a C/C composite of the present invention comprises procedures similar to those used in the prior art including preparing a prepreg by impregnating carbon fibers with a resin, curing the prepreg, post-curing the cured prepreg, carbonizing the cured prepreg, graphitizing the first carbonized semi-product, and densifying the first graphitized semi-product one or more times, and carrying out the final graphitization. The densifying may adopt the techniques used in the prior art, or may use the technique of the present invention comprising using a heating rate greater than 20° C./min up to 1500° C./min during re-carbonization.

The success of the fast-carbonization method of the present invention is related to many material and process parameters. For example, randomly-oriented short carbon fiber has been proven especially effective in the prevention of delamination or cracking of the C/C composite prepared according to the fast-carbonization method of the present invention, although use of other types of carbon fiber can also be successful when combing with proper material and process parameters.

The method of the present invention is successful in preparing a C/C composite having a thickness of 1.0 cm and a length and width both of 11.0 cm. A C/C composite having greater dimensions, for example having a thickness of 3.0 cm, may be successfully prepared according to the method of the present invention; however, this has not been done due to the size of the furnace used by the inventors. When the thickness is greater than 3.0 cm, the inventors of the present invention think that the disintegration of the C/C composite during the fast carbonization still can be avoided by using different woven carbon fiber cloth or randomly-oriented carbon fibers with different aspect ratios, and optionally by forming an array of through thickness holes over the prepreg.

The present invention can be better understood through the following examples which are merely for illustrative and not for limiting the scope of the present invention.

General Description of Typical Experimental Procedures

FIG. 1 shows a flowchart for fabrication processes of C/C composites and their codes for different process stages. The codes for the first carbonization, the first graphitization, four cycles of densification, and the second graphitized stages were C1, G1, D1~D4, and G2, respectively. The carbon fibers were first impregnated with the phenolic resin in a plastic mold in vacuum to form a prepreg. The prepreg was placed in an oven at 60-100° C. for 0.5-24 hours to remove excess solvent, followed by a hot press curing process in a stainless steel mold at 160° C. for 30 min to cure the prepreg. The cured carbon fiber-reinforced polymer (CFRP) was sectioned into 50 mm×10 mm coupons using a water-cooled diamond saw, followed by an optional post-curing process at 230° C. for 8 hours in an air-circulated oven.

Carbonization was conducted by heating the post-cured CFRP in nitrogen atmosphere to 800-1200° C. To demonstrate the effect of carbonization (heating) rate on properties of the composite, different heating rates were used. The carbonization at low heating rate (1° C./m) was conducted in an ordinary furnace heated by SiC heating element in nitrogen. The nitrogen gas was introduced continuously into the furnace at a constant flow rate of 0.3 L/m.

Carbonization at higher heating rates (100-1000° C./min) was conducted using an apparatus specially designed for the present invention. A 25 mm diameter quartz tube that could be slid in and out a $MoSi_2$-heated tube furnace (Model F59348CM, Barnstead/Thermolyne, Iowa, USA) at a controlled speed to adjust the heating rate of the C—C sample placed within the quartz tube. The temperature of the C—C sample was determined using a K type thermocouple inserted into the quartz tube and attached to the sample. Once a temperature-quartz tube speed calibration profile is obtained, the use of thermocouple was not necessary for every run when samples of the same specification were used. When the desired temperature (i.e., 1200° C.) was reached, the quartz tube was pushed into the center of the furnace at a controlled, constant speed. Nitrogen gas was introduced continuously into the quartz tube at a flow rate of 0.7 L/min during the entire carbonization process.

Following carbonization, some of the carbonized composite was subsequently graphitized to 2200° C. (Note: The term "graphitized" or "graphitization" was conveniently used throughout text to stand for the heat treatment at >2000° C., not an indication of a major three-dimensional ordering in crystal structure). The porous carbonized/graphitized composite was then densified by re-impregnation with a thermosetting polymer (phenolic resin or furfural alcohol resin) in vacuum, followed by pre-curing at 70° C. for 6 hours to remove excess solvent; curing at 160° C. for 30 min; and post-curing at 230° C. for 2 hours in an air-circulated oven. The post-cured composite was re-carbonized at the same carbonization rate as that used in the first carbonization process. To improve the density and properties of the composite, as many as four such densification/carbonization cycles were applied. After four re-impregnation/carbonization cycles, some C/C composites were second graphitized to convert the densified matrix carbon to a more graphitic structure.

Among the variety of measurements it is particularly worth noting that the change in composite thickness after first carbonization treatment is most critical to determine whether the entire fabrication process would be successful or not. Although a decrease in sample thickness after first carbonization does not promise success, a significant increase in sample thickness after first carbonization is an indication of at least a local delamination and indication of a high possibility for failure.

Example 1

C/C composites were prepared from different fiber volume fractions and carbonization rates. The carbon fibers were random type. The specimen dimensions were 50×20×10 mm. The samples were processed to stage C1. The PAN-based carbon fibers (Torayca T700S, 12K, Toray Co., Japan), chopped to length 4.5 mm were first impregnated with a resole-type phenolic resin (PF-650, Chang Chun Petrochemical Industry, Taiwan) in a plastic mold in vacuum to form a prepreg. The prepreg was placed in an oven at 70° C. for 6 hours to remove excess solvent, followed by a hot press curing process in a stainless steel mold at 400 psi, and 160° C. for 30 min. The cured composite was sectioned into 50 mm×20 mm×10 mm coupons using a water-cooled diamond saw, followed by a post-curing process at heating rate 1° C./min till 160° C., then 0.5° C./min to 230° C., held for 2 hours in an air-circulated oven.

Carbonization was conducted by heating the post-cured composite in nitrogen atmosphere to 1000° C. with three heating rates: 20, 300 and 600° C./min. The nitrogen gas was introduced continuously into the furnace at a constant flow rate of 0.3 L/m. The carbonization process was conducted using the apparatus specially designed for high-speed carbonization process as described above in a 25 mm diameter quartz tube.

The bulk density and porosity were determined using water saturation method according to ASTM C830 standard. Sample weights were measured using a HF-300 multi-function balance (A&D Company, Limited, Japan). The flexural strength and modulus of the composite were measured using a Shimadzu AGS-500D universal tester (Shimadzu Corp., Kyoto, Japan) at a crosshead speed of 1.0 mm/min. The samples for three-point bending test were prepared according to ASTM D790 specification. A support span of 40 mm was used for the test.

SUMMARY OF MATERIALS AND METHODS

Fiber: PAN-based carbon fiber (Torayca T700S, 12K, Toray Co., Japan) chopped to length 4.5 mm
Resin: Resole-type phenolic resin (PF-650, Chang Chun Petrochemical Industry, Taiwan)
Hot press: 400 psi, 160° C. for 30 min.
Specimen size: 50×20×10 mm
Carbonization Rate:
(1) 20° C./min till 1200° C., held for 30 min.
(2) 300° C./min till 1200° C., held for 3 min.
(3) 600° C./min till 1200° C., held for 3 min.

Tube furnace for carbonization process: High temperature tube furnace (Model Number: F59348CM, Barnstead/Thermolyne, USA)
Sample process stage: C1
Measurements
Density and porosity: Determined by water saturation method according to ASTM C830 standard method.
Weight: Measured by a HF-300 Multi-Function Balance (A&D Company, Limited, Japan).
Mechanical properties: ASTM D790 standard, 3-point bending
Crosshead speed: 1 mm/min; support span: 40 mm
SHIMADZU AGS-500D universal tester (Shimadzu Corporation, Japan)
Thickness: Measured by a Digimatic Outside Micrometer (Mitutoyo Corporation, Japan)
Carbon Fiber Volume Fraction (%):
The volume of carbon fiber in a hot-pressed carbon fiber-resin composite was determined by the weight of the fiber mixed in the resin divided by the density of the fiber. The volume fraction of the fiber was determined by the volume of the carbon fiber divided by the total volume of the cured composite which was easy to be measured.

TABLE 1-1

Weight and thickness changes after carbonization

| | | Carbon fiber volume fraction (%) | | | | | | | | | |
|---|---|---|---|---|---|---|---|---|---|---|---|
| | | 20 | 30 | 40 | 50 | 55 | 60 | 65 | 70 | 75 | 80 |
| 20° C./min | Weight (%) | −24.06 | −25.67 | −16.77 | −16.96 | −13.85 | −14.49 | −13.63 | −13.14 | −10.55 | −10.45 |
| | Thickness (%) | −14.14 | −11.14 | −6.20 | −4.24 | −2.07 | −1.38 | −1.15 | −0.36 | −0.66 | 0.63 |
| 300° C./min | Weight (%) | — | — | — | −17.35 | −14.07 | −14.64 | −12.50 | −10.37 | — | — |
| | Thickness (%) | — | — | — | −2.13 | −0.29 | 0.61 | 0.30 | 2.62 | — | — |
| 600° C./min | Weight (%) | −27.74 | −27.14 | −17.27 | −15.76 | −13.46 | −13.14 | −13.54 | −10.74 | — | — |
| | Thickness (%) | −9.01 | −10.70 | −2.36 | −0.94 | −0.33 | 1.44 | 0.8 | 2.35 | — | — |

TABLE 1-2

Densities (g/ml) before and after carbonization

| | | Carbon fiber volume fraction (%) | | | | | | | | | |
|---|---|---|---|---|---|---|---|---|---|---|---|
| | | 20% | 30% | 40% | 50% | 55% | 60% | 65% | 70% | 75% | 80% |
| 20° C./min | Before carbonization | 1.19 | 1.35 | 1.40 | 1.47 | 1.49 | 1.56 | 1.57 | 1.56 | 1.54 | 1.55 |
| | After carbonization | 1.13 | 1.23 | 1.28 | 1.28 | 1.31 | 1.36 | 1.38 | 1.36 | 1.40 | 1.39 |
| 300° C./min | Before carbonization | — | — | — | 1.47 | 1.50 | 1.55 | 1.57 | 1.58 | | |
| | After carbonization | — | — | — | 1.25 | 1.29 | 1.32 | 1.37 | 1.38 | | |
| 600° C./min | Before carbonization | 1.12 | 1.35 | 1.41 | 1.49 | 1.49 | 1.56 | 1.56 | 1.57 | | |
| | After carbonization | 1.02 | 1.16 | 1.30 | 1.27 | 1.29 | 1.33 | 1.34 | 1.37 | | |

TABLE 1-3

Porosity (vol %) before and after carbonization

| | | Carbon fiber volume fraction (%) | | | | | | | | | |
|---|---|---|---|---|---|---|---|---|---|---|---|
| | | 20% | 30% | 40% | 50% | 55% | 60% | 65% | 70% | 75% | 80% |
| 20° C./min | Before carbonization | 17.63 | 6.09 | 9.36 | 4.56 | 4.00 | 2.89 | 3.37 | 2.59 | 7.49 | 7.21 |
| | After carbonization | 17.66 | 21.58 | 15.60 | 26.18 | 24.50 | 22.15 | 21.02 | 19.77 | 16.51 | 17.59 |
| 300° C./min | Before carbonization | — | — | — | 3.99 | 3.78 | 3.06 | 3.81 | 2.79 | — | — |
| | After carbonization | — | — | — | 24.04 | 22.67 | 18.31 | 19.94 | 16.78 | — | — |
| 600° C./min | Before carbonization | 20.46 | 6.40 | 9.77 | 4.38 | 3.99 | 4.18 | 3.52 | 2.89 | — | — |
| | After carbonization | 25.41 | 27.81 | 22.67 | 23.65 | 26.84 | 21.90 | 22.78 | 19.69 | — | — |

TABLE 1-4

Bending properties after carbonization

| | | Carbon fiber volume fraction (%) | | | | | | |
|---|---|---|---|---|---|---|---|---|
| | | 50% | 55% | 60% | 65% | 70% | 75% | 80% |
| 20° C./min | Strength (MPa) | 15.2 | 17.0 | 19.1 | 16.3 | 17.4 | 13.6 | 11.7 |
| | Modulus (GPa) | 6.2 | 7.0 | 11.6 | 8.0 | 9.0 | 8.5 | 7.7 |
| 300° C./min | Strength (MPa) | 14.0 | 14.7 | 17.9 | 15.7 | 6.2 | — | — |
| | Modulus (GPa) | 5.0 | 4.4 | 9.6 | 8.3 | 2.4 | — | — |
| 600° C./min | Strength (MPa) | 11.9 | 14.0 | 11.8 | 11.4 | 7.8 | — | — |
| | Modulus (GPa) | 4.5 | 7.3 | 5.3 | 5.9 | 3.6 | — | — |

All samples prepared with carbonization rate of 20° C./min remain their structural integrity with all fiber volume fractions (20%-80%). The composites prepared with carbonization rate of 300° C./min and 600° C./min remain their structural integrity with fiber volume fractions up to 55%. With higher fiber contents, the thickness became slightly increased. Weight and density always increased with increasing fiber volume fraction at all carbonization rates both before and after carbonization. Carbonization-induced decreases in thickness and weight decreased with increasing fiber volume fraction. In general, the porosity values slightly increased with increasing carbonization rate. At 20° C./min, the lowest porosity values before carbonization, while the highest porosity value after carbonization, were obtained from composites prepared with intermediate fiber volume fractions (about 50-70 vol %). At higher carbonization rates, these phenomena were less obvious. Both bending strength and modulus decreased with carbonization rate. In general, the highest strength and modulus were obtained from composites prepared with fiber volume fractions about 55-65%.

Example 2

The procedures of example 1 were repeated with six different kinds of fibers. A fixed fiber volume fraction (50 vol %) and two different carbonization rates, 100 and 600° C./min, were used. The properties were determined using the same method as in Example 4.

Sample Preparation

Fiber:
  L: Toray T-700S PAN-based fiber, chopped to length 12 mm
  H: Toray T-700S PAN-based fiber, chopped to length 4.5 mm
  P: Thorne P25W pitch-based fiber, chopped to length 12 mm
  T: Toray T-300 PAN-based fiber, chopped to length 12 mm
  PW: PAN-based 2D woven cloth
Resin: Phenolic resin PF-650 (resole-type)
Hot press: 400 psi, 160° C. for 30 min.
Specimen dimensions: 50×20×10 mm Carbonization Rate:
(1) 100° C./min till 1200° C., held for 3 min.
(2) 600° C./min till 1200° C., held for 3 min.

Furnace for Carbonization Process:
High temperature tube furnace (Model Number: F59348CM, Barnstead/Thermolyne, USA)

Sample Process Stage: C1

Measurements
Density and porosity: Determined using water saturation method according to ASTM C830 standard.
Weight measured by a HF-300 Multi-Function Balance (A&D Company, Limited, Japan)

Mechanical Properties:
ASTM D790 standard, 3-point bending
Crosshead speed: 1 mm/min; support span: 40 mm
SHIMADZU AGS-500D universal tester (Shimadzu Corporation, Japan)

Thickness
Thickness measured by a Digimatic Outside Micrometer (Mitutoyo Corporation, Japan)

TABLE 2-1

Weight and thickness changes (%) after carbonization

| | | Sample Code | | | | |
|---|---|---|---|---|---|---|
| | | L | P | T | PW | H |
| 100° C./min | Weight | −15.18 | −25.90 | −29.81 | −12.75 | −22.48 |
| | Thickness | −4.51 | −12.81 | −16.59 | −1.77 | −4.14 |
| 600° C./min | Weight | −17.28 | −25.01 | −26.88 | −9.95 | −15.76 |
| | Thickness | −4.65 | −11.08 | −9.73 | 0.68 | −0.94 |

TABLE 2-2

Density and porosity changes (%) after carbonization

| | | Sample Code | | | | |
|---|---|---|---|---|---|---|
| | | L | P | T | PW | H |
| 100° C./min | Density | −10.01 | −12.77 | −17.50 | −9.78 | −15.31 |
| | Porosity | 163 | 104 | 405 | 212 | 789 |
| 600° C./min | Density | −10.08 | −12.87 | −14.41 | −9.72 | −14.86 |
| | Porosity | 121 | 82 | 135 | 205 | 573 |

TABLE 2-3

Bending properties after carbonization

| | | Sample Code | | | | |
|---|---|---|---|---|---|---|
| | | L | P | T | PW | H |
| 100° C./min | Strength (MPa) | 41.21 | 25.52 | 30.22 | 53.95 | 16.19 |
| | Modulus (GPa) | 18.67 | 5.71 | 16.91 | 22.60 | 6.45 |
| 600° C./min | Strength (MPa) | 41.11 | 18.42 | 26.78 | 48.89 | 11.85 |
| | Modulus (GPa) | 19.79 | 4.63 | 15.32 | 26.93 | 4.52 |

All composites prepared with carbonization rate of 100° C./min remain their structural integrity after first carbonization. All composites (except PW which showed a slight increase in thickness) prepared with carbonization rate of 600° C./min still remain their structural integrity. With higher fiber contents, the thickness became slightly increased. Samples L and PW had the largest strength and modulus values among all materials. In general, the bending strength (except L) and modulus (except L and PW) of samples prepared from carbonization rate of 600° C./min were both lower than those from 100° C./min. The composite prepared from longer chopped fiber (Sample L) had much higher strength and modulus values than that from shorter chopped fiber (Sample H).

Example 3

The PAN-based carbon fibers (Torayca T700S, 12K, Toray Co., Japan), chopped to length 4.5 mm were first impregnated with the Resole-type phenolic resin (PF-650, Chang Chun Petrochemical Industry, Taiwan) in a plastic mold in vacuum to form a prepreg. The carbon fibers were random type. The prepreg was placed in an oven at 70° C. for 6 hours to remove excess solvent, followed by a hot press curing process in a stainless steel mold with a vacuum bag at 400 psi and 160° C. for 30 min. The cured composite was sectioned into 50 mm×10 mm×2.5 mm coupons using a water-cooled diamond saw, followed by a post-curing process at heating rate 1° C./min. till 160° C., then 0.5° C./min. to 230° C., hold for 8 hr. in an air-circulated oven.

Carbonization was conducted by heating the post-cured composite in nitrogen atmosphere to 1200° C. at five different heating rates: 1, 15, 100, 300 and 1000° C. The carbonization at heating rates 1 and 15° C./min were conducted in an ordinary furnace heated by SiC heating element in nitrogen. The carbonization at the other three heat rates were conducted using the apparatus specially designed for high-speed carbonization process as described above in a 25 mm diameter quartz tube. The nitrogen gas was introduced continuously into the furnace at a constant flow rate of 0.3 L/m.

After the first carbonization, the porous C/C composites were graphitized to 2200° C. for the first time (G1 stage). The first graphitized composite was then densified by re-impregnation with a phenolic resin in vacuum, followed by pre-curing at 70° C. for 6 hours to remove excess solvent; curing at 160° C. for 30 min; and post-curing at 230° C. for 2 hours in an air-circulated oven. The post-cured composite was re-carbonized at the same carbonization rate as that used in the first carbonization process. Following four cycles of densification/carbonization, the composites were graphitized to 2200° C. for the second time. The samples were processed to stage G2. The properties were determined using the same method as in Example 1.

Sample Preparation
Fiber: PAN-based carbon fiber (Torayca T700S, 12K, Toray Co., Japan) chopped to length 4.5 mm
Resin: Resole-type phenolic resin (PF-650, Chang Chun Petrochemical Industry, Taiwan)
Hot press: 400 psi, 160° C. for 30 min in vacuum bag.
Specimen size: 50 mm×10 mm×2.5 mm
Post-curing: 1° C./min from R.T. to 160° C., then 0.5° C./min to 230° C., held for 8 hours for first post-curing (prior to first carbonization) and 2 hours for following cycles.

Carbonization Heating Rate:
(1) 1° C./min till 1200° C., held for 30 min.
(2) 15° C./min till 1200° C., held for 3 min.
(3) 100° C./min till 1200° C., held for 3 min.
(4) 300° C./min till 1200° C., held for 3 min.
(5) 1000° C./min till 1200° C., held for 3 min.
Graphitization: 2 atm He atmosphere, 10° C./min from RT to 2200° C., held for 30 min.
Graphitization furnace (Model: 1000-3060-FP20, Thermal Technology Inc., USA)
Densification cycle: resin re-impregnation in vacuum→solvent removal→curing at 160° C. for 30 min.→post-curing→carbonization
Sample Process Stage: G2

Measurements
Density and porosity: Determined using water saturation method according to ASTM C830 standard.
Weight: Measured by a HF-300 Multi-Function Balance (A&D Company, Limited, Japan)

Mechanical Properties:
ASTM D790 standard, 3-point bending
Cross head speed: 1 mm/min; support span: 40 mm
SHIMADZU AGS-500D universal tester (Shimadzu Corporation, Japan)

TABLE 3-1

Density and porosity

| | Open porosity (vol %) | | | | | Bulk density (g/ml) | | | | |
|---|---|---|---|---|---|---|---|---|---|---|
| Carbonization rate | 1° C./min | 15° C./min | 100° C./min | 300° C./min | 1000° C./min | 1° C./min | 15° C./min | 100° C./min | 300° C./min | 1000° C./min |
| Cured | | | 3.16 | | | | | 1.57 | | |
| Carbonized (C1) | 18.13 | 17.35 | 16.94 | 16.31 | 15.73 | 1.42 | 1.43 | 1.41 | 1.39 | 1.38 |
| 1$^{st}$ Graphitized (G1) | 12.13 | 11.16 | 10.04 | 14.67 | 15.06 | 1.43 | 1.41 | 1.41 | 1.40 | 1.38 |
| 4$^{th}$ densified (D4) | 5.13 | 4.35 | 4.84 | 6.93 | 8.23 | 1.62 | 1.61 | 1.58 | 1.56 | 1.56 |
| 2nd graphitized (G2) | 3.04 | 3.44 | 2.43 | 5.87 | 9.36 | 1.62 | 1.61 | 1.59 | 1.55 | 1.56 |

TABLE 3-2

Mechanical properties

| | Flexural strength (MPa) | | | | | Flexural modulus (GPa) | | | | |
|---|---|---|---|---|---|---|---|---|---|---|
| Carbonization rate | 1° C./min | 15° C./min | 100° C./min | 300° C./min | 1000° C./min | 1° C./min | 15° C./min | 100° C./min | 300° C./min | 1000° C./min |
| 1$^{st}$ carbonized (C1) | 22.6 | 21.5 | 20.3 | 26.0 | 23.8 | 9.5 | 10.2 | 7.7 | 10.3 | 8.6 |
| 1$^{st}$ graphitized (G1) | 21.2 | 19.6 | 25.4 | 17.4 | 30.2 | 7.5 | 6.3 | 8.5 | 7.2 | 10.5 |
| 4$^{th}$ densified (D4) | 69.5 | 54.1 | 56.5 | 43.1 | 69.5 | 29.4 | 22.7 | 25.5 | 20.1 | 23.2 |
| 2$^{nd}$ graphitized (G2) | 51.7 | 28.0 | 25.4 | 54.2 | 55.3 | 19.4 | 10.3 | 10.2 | 17.9 | 17.0 |

Although high-speed carbonization results in a lower density and higher porosity level, it is surprising to see that, after 2nd graphitization (G2), the strengths and moduli of fast-carbonized (particularly >100° C./min) composites dramatically increased. For example, the flexural strength and modulus of the samples prepared from the carbonization rate of 1000° C./min were not much different from those prepared from 1° C./min.

Table 3.3 lists the bending fracture energy data of the second-graphitized samples prepared with carbonization rates of 1, 100 and 1000° C./min which are designated as G2-1, G2-100 and G2-1000, respectively. Although the fracture energy of G2-100 is lower than G2-1, the fracture energy of G2-1000 is higher than G2-1 by as much as 38%.

TABLE 3.3

Effect of carbonization rate on bending fracture energy

| | Sample code | | |
|---|---|---|---|
| | G2-1 | G2-100 | G2-1000 |
| Fracture energy | 3.51 Kgf-mm | 1.91 Kgf-mm | 4.86 Kgf-mm |

Example 4

The procedures prior to first densification of Example 3 were repeated. Samples in this example had a larger size (110 mm×110 mm×10 mm). To accommodate samples of this size, an apparatus specially designed for high-speed carbonization was attached to the ordinary furnace in Example 1. This apparatus is a gastight stainless steel chamber with a screw rod and a motor. Sample could be push in and out the heating zone at a controlled, constant speed. Two carbonization rates, 100 and 1000° C./min, were used.

Sample Preparation

Fiber: PAN-based carbon fiber (Torayca T700S, 12K, Toray Co., Japan) chopped to length 4.5 mm Resin: Resole-type phenolic resin (PF-650, Chang Chun Petrochemical Industry, Taiwan)

Hot press: 400 psi, 160° C. for 30 min.

Specimen size: 110 mm×110 mm×10 mm

Post-curing: heating rate 1° C./min till 160° C., then 0.5° C./min to 230° C., held for 8

Carbonization Heating Rate:

(1) 100° C./min till 1200° C., held for 3 min.

(2) 1000° C./min till 1200° C., held for 3 min.

Graphitization: Argon atmosphere, 10° C./min from RT to 2200° C., held for 60 min.

Graphitization furnace: (Model No.: S45-20x24-G-G-D6A6-C-25, Centorr Vacuum Industries, USA)

Sample Process Stage: G1

Measurements

Weight was measured by a HF-300 Multi-Function Balance (A&D Company, Limited, Japan). Thickness was measured by a Digimatic Outside Micrometer (Mitutoyo Corporation, Japan)

TABLE 4-1

Weight and Thickness Changes

|  |  | 1st carbonized (C1) | 1st graphitized (G1) |
|---|---|---|---|
| 100° C./min | Weight change (%) | −20.95 | −23.92 |
|  | Thickness change (%) | −3.40 | −5.47 |
| 1000° C./min | Weight change (%) | −18.41 | −22.58 |
|  | Thickness change (%) | −1.31 | −4.66 |

With a size almost 100 times larger than that in Example 3, the composites prepared from high-speed carbonization still remained their structural integrity after first graphitization. The changes in weight and thickness of the two composites (with carbonization rates of 100° C./min and 1000° C./min, respectively) were not much different. This result indicates the feasibility for fabricating large-sized C/C composites with high carbonization rates.

Example 5

Tribological Performance of Composites Prepared from Different Carbonization Rates Experimental Description To prepare the C/C composites for the study, the PAN-based carbon fibers (Torayca T700S, 12K, Toray Co., Japan) chopped to a length of 4.5 mm were first impregnated with a resole-type phenolic resin (PF-650, Chang Chun Petrochemical Industry, Taiwan) in a plastic mold in vacuum to form a prepreg. The prepreg was pre-cured in an oven at 70° C. for 6 h to remove excess solvent, followed by a hot-press curing process in a stainless steel mold at 160° C. for 30 min. The cured composite was machined into doughnut-shaped samples, followed by post-curing in an air-circulated oven to 160° C. at a heating rate of 1° C./min and then to 230° C. at a heating rate of 0.5° C./min. The samples were held at 230° C. for 8 h to complete the post-curing process.

Carbonization was conducted by heating the post-cured composite in nitrogen atmosphere to 1200° C. at three different heating rates (1, 100 and 1000° C./min). Carbonization at 1° C./min was conducted in an ordinary furnace heated by SiC heating element in nitrogen. The nitrogen gas was introduced continuously into the furnace during the entire carbonization process. Carbonization at higher heating rates (100 and 1000° C./min) was conducted using an apparatus specially designed for the study. This apparatus was attached to a furnace enclosing a stainless steel gastight chamber with a motor-driven screw rod. When the desired temperature (1200° C.) was reached, the sample holder was pushed into the center of the furnace at a controlled, constant speed.

The first-carbonized samples were graphitized to 2200° C. at a heating rate of 10° C./min and held for 30 min in a helium-purged furnace (Model 1000-3060-FP20, Thermal Technology Inc., Santa Barbara, Calif., USA). The porous graphitized composite was then densified by re-impregnation with same phenolic resin in vacuum, followed by same curing, post-curing and carbonization procedure. To improve the density and properties of the composite, four such densification/carbonization cycles and a second graphitization treatment were applied to all samples. The second-graphitized samples prepared with carbonization rates of 1, 100 and 1000° C./min are designated G2-1, G2-100 and G2-1000, respectively. The density and porosity of the composites were measured by the same method as in Example 4.

Friction and wear tests of C/C composites were conducted in air with relative humidity of 50-60% using a homemade disk-on-disk sliding wear tester. For the samples having an outer diameter of 25 mm and inner diameter of 10 mm, one unit rpm is equivalent to an average linear speed of 0.055 m/min. A load of 0.8 MPa and fixed rotor speed of 1000 rpm were used for all tests. Prior to testing, all samples were mechanical polished to #1200 grit level, followed by ultrasonic cleaning to remove debris on surface. The constant-speed slide testing was performed by first accelerating the rotor sample to the desired speed (1000 rpm). When the rotor speed was reached, the stator sample (same composite under same surface condition) was loaded with a normal pressure of 0.8 MPa against the rotor for 2 minutes, before the power of the motor was automatically switched off. Prior to each subsequent test, the samples were allowed to cool to room temperature. The tests were conducted for six times for each sample. The COF, $\mu$, was determined using the equation, $\mu=M/rF_n$, where M is the torque, $F_n$ the normal force and r the average radius of the sample.

Sample Preparation

Fiber: PAN-based carbon fiber (Torayca T700S, 12K, Toray Co., Japan) chopped to length 4.5 mm Resin: Resole-type phenolic resin (PF-650, Chang Chun Petrochemical Industry, Taiwan)

Hot press: 400 psi, 160° C. for 30 min in vacuum bag.

Specimen size: Outer diameter 25 mm, inner dia. 10 mm, thickness 4 mm

Post-curing: 1° C./min from R.T. to 160° C., then 0.5° C./min to 230° C., held for 8 hours for first post-curing (prior to first carbonization) and 2 hours for following cycles.

Carbonization Heating Rate:

(1) 1° C./min till 1200° C., held for 30 min.
(2) 100° C./min till 1200° C., held for 3 min.
(3) 1000° C./min till 1200° C., held for 3 min.

Graphitization: 2 atm He, 10° C./min from RT to 2200° C., held for 30 min.

Graphitization furnace: Model 1000-3060-FP20, Thermal Technology Inc., USA.

Densification cycle: resin re-impregnation in vacuum→solvent removal→curing at 160° C. for 30 min.→post-curing→carbonization Sample Process Stage: G2

Measurements

Density and Porosity:

Porosity was determined using water saturation method according to ASTM C830 standard. Weight was measured by a HF-300 Multi-Function Balance (A&D Company, Limited, Japan)

Coefficient of Friction (COF) and Weight Loss:

Methods as described in the above Experimental description

TABLE 5-1

Effect of carbonization rate on wear rate and friction coefficient.
Constant velocity wear test: 1000 rpm, 0.8 MPa, 2 min

| Sample | Bulk density (g/cm³) | Open porosity (Vol. %) | Average COF | Weight loss/ test (g) |
|---|---|---|---|---|
| G2-1 | 1.63 | 7.4 | 0.43 | 0.020 |
| G2-100 | 1.58 | 9.1 | 0.40 | 0.023 |
| G2-1000 | 1.57 | 9.1 | 0.45 | 0.044 |

As carbonization rate increased from 1° C./min to 1000° C./min, the composite did not experience much difference in average friction coefficient (between 0.43 and 0.45). The average weight loss per test, however, increased markedly from 0.020 to 0.044 g.

Example 6

Method for Improving Tribological Performance of Fast-Carbonized Composite

The processes to prepare the C/C composites up to stage G2 were repeated as described in Example 5. As indicated in Example 5, the tribological performance (particularly wear) of the present fast-carbonized (1000° C./min) composite was found inferior to that prepared from lower carbonization rates. Therefore the purpose of this example is to improve the tribological performance (particularly reducing wear rate) of the fast-carbonized composite by applying, after second graphitization (G2), an additional cycle of impregnation, curing, carbonization and graphitization (termed "post-treatment"). In this post-treatment, two different liquid precursors (furan resin and coal tar pitch) and three different additives (carbon black, graphite powder and mesophase pitch) were used. The manufacturers and selected properties of the various raw materials for the study are listed in Table 6-1.

The post-treatment was conducted by first impregnating the composites with a carbonaceous additive (1 wt %)-doped liquid precursor in vacuum. Two liquid/additive combinations—furan resin/carbon black (designated "FB") and coal tar pitch/mesophase pitch powder (designated "PM") were selected for the study. The impregnation of the carbon black-doped thermosetting furan resin with a relatively low viscosity was carried out at room temperature. The impregnation of mesophase pitch powder-doped coal tar pitch was conducted in a vacuum chamber at 110° C. to allow the pitch to have a viscosity low enough to infiltrate into the open pores of the composites.

The impregnated composites were placed in an oven at 70° C. for 6 hours to remove excess solvent, followed by curing (160° C. for 30 min in air), post-curing (230° C. for 2 hours in air) and carbonization (1200° C. for 30 min in nitrogen) processes. The carbonized samples were subsequently graphitized to 2200° C. for 30 min in a helium-purged furnace (Model 1000-3060-FP20, Thermal Technology Inc., Santa Barbara, Calif., USA).

Designation of samples prepared from different precursors/additives for the post treatment is given in Table 6-2. The methods for friction and wear tests were the same as described in Example 5.

Liquid Precursors:
(1) Furan resin (CF-7432, Chang Chun Petrochemical Industry, Taiwan)
(2) Coal tar pitch (STP-1, China Steel Chemical Corporation, Taiwan)

Additives:
(1) Carbon black (N-220, 20 nm, China Synthetic Rubber Co., Taiwan)
(2) Graphite powder (CB-400, 90%>75 μm Nippon Graphite Industries Co., Ltd., Japan)
(3) Mesophase pitch (Green CSMB, 15~25 μm, China Steel Chemical Corporation, Taiwan)

TABLE 6-1

Manufacturers and selected properties of raw materials for post-treatment.

| Material | Specification | Manufacturer |
|---|---|---|
| Liquid precursor | | |
| Furan resin | CF-7432<br>Viscosity at 25° C.: 15~30 cps<br>Density: 1.16~1.19 g/cm$^3$ | Chang Chun Petrochemical Industry, Taiwan |
| Coal tar pitch | STP-1<br>Viscosity at 25° C.: 2000-3000 cps<br>Density: 1.18~1.24 g/cm$^3$ | China Steel Chemical Corp., Taiwan |
| Additive | | |
| Carbon black | N-220<br>Particle size: 20 nm<br>Density: 1.80~1.82 g/cm$^3$ | China Synthetic Rubber Co., Taiwan |
| Graphite powder | CB-400<br>90% particle size: >75 μm | Nippon Graphite Industries Co., Ltd., Japan |
| Mesophase pitch | Green CSMB<br>Particle size: >15~25 μm<br>Density: 1.70 g/cm$^3$ | China Steel Chemical Corp., Taiwan |

TABLE 6-2

Designation of samples prepared from different post-treatments.

| Group | precursor | additive |
|---|---|---|
| O | — | — |
| F | Furan resin | — |
| F-CB | Furan resin | Carbon black |
| F-G | Furan resin | Graphite powder |
| F-M | Furan resin | Mesophase pitch |
| P | Coal tar pitch | — |
| P-CB | Coal tar pitch | Carbon black |
| P-G | Coal tar pitch | Graphite powder |
| P-M | Coal tar pitch | Mesophase pitch |

TABLE 6-3

Tribological performance of G2-1000 with different post-treatments
Constant velocity wear test: 1000 rpm, 0.8 MPa, 2 min

| Sample code | Precursor | Additive | Bulk density (g/ml) Before | Bulk density (g/ml) after | Porosity (Vol %) before | Porosity (Vol %) after | Average COF | Average weight loss/test (g) |
|---|---|---|---|---|---|---|---|---|
| O | — | — | 1.576 | 1.590 | 9.27 | 10.12 | 0.37 ± 0.0179 | 0.0516 ± 0.0084 |
| F | Furan | — | 1.567 | 1.593 | 8.38 | 7.83 | 0.40 ± 0.0300 | 0.0317 ± 0.0063 |
| F-CB | Furan | Carbon black | 1.541 | 1.561 | 8.29 | 8.16 | 0.36 ± 0.0436 | 0.0164 ± 0.0067 |

TABLE 6-3-continued

Tribological performance of G2-1000 with different post-treatments
Constant velocity wear test: 1000 rpm, 0.8 MPa, 2 min

| Sample code | Precursor | Additive | Bulk density (g/ml) Before | Bulk density (g/ml) after | Porosity (Vol %) before | Porosity (Vol %) after | Average COF | Average weight loss/test (g) |
|---|---|---|---|---|---|---|---|---|
| F-G | Furan | Graphite powder | 1.557 | 1.577 | 9.30 | 8.43 | 0.40 ± 0.0475 | 0.0216 ± 0.0058 |
| F-M | Furan | Mesophase pitch | 1.603 | 1.598 | 6.37 | 7.38 | 0.37 ± 0.0510 | 0.0186 ± 0.0062 |
| P | Pitch | — | 1.554 | 1.590 | 9.78 | 8.62 | 0.34 ± 0.0336 | 0.0160 ± 0.0027 |
| P-CB | Pitch | Carbon black | 1.535 | 1.582 | 9.75 | 6.52 | 0.38 ± 0.0423 | 0.0091 ± 0.0020 |
| P-G | Pitch | Graphite powder | 1.544 | 1.578 | 9.45 | 7.00 | 0.31 ± 0.0629 | 0.0126 ± 0.0040 |
| P-M | Pitch | Mesophase pitch | 1.545 | 1.580 | 8.68 | 7.53 | 0.39 ± 0.0248 | 0.0091 ± 0.0014 |

Except F-M, all samples demonstrate slight increases in density and decreases in porosity after the post-treatment. Pitch-group samples generally have larger changes in density and porosity than furan-group samples. After the post-treatment, all samples demonstrate decreases in both COF and weight loss. Pitch-group samples generally exhibit lower weight losses than furan-group samples. Samples P-CB and P-M demonstrate the lowest weight losses among all samples tested (only half that of G2-1), while still maintaining relatively high COF values (close to 0.4). These results indicate that an appropriate post-treatment, especially a pitch treatment, may dramatically improve the tribological performance of fast-carbonized C/C composite.

Example 7

Effect of Matrix and Additive on Tribological Behavior

Experimental Description

The C/C composites in this example were prepared by two methods. One method is the same with Example 6. The other method was performed by wet-mixing appropriate amount of 200 mesh-sized phenolic resin powder (Orchid Resources Co., Taipei, Taiwan) with 55 vol % of PAN-based carbon fiber (Torayca T700S, 12K, chopped to length 4.5 mm, Toray Co., Japan), followed by hot pressing the mixture at 160° C. for 30 min under a pressure of 400 psi. Alcohol was used as a solvent in the wet-mixing technique, while carbon black and graphite powder were optionally used as additives/fillers. Before carbonization, all samples were treated by a post-curing process at 180° C. for 30 min. in an air-circulated oven. The carbonization process was performed with a heating rate of 1000° C./min as the method in Example 1. All samples were processed to stage G2.

The bulk density and open porosity were determined using the same method with Example 1. Coefficient of friction (COF) and weight loss were obtained by the methods described in experimental description of Example 5.

Sample Preparation
Fiber: PAN-based carbon fiber (Torayca T700S, 12K, Toray Co., Japan) chopped to length 4.5 mm Resin:
(1) Liquid: Resole-type phenolic resin (PF-650, Chang Chun Petrochemical Industry, Taiwan)
(2) Powdered: Novolac-type phenolic resin, 200 mesh (RM-18389, Orchid Resources Co., Taipei, Taiwan); mixing solvent: alcohol Additives:
(1) Carbon black (N-220, 20 nm, China Synthetic Rubber Co., Taiwan)
(2) Graphite powder (CB-400, 90%>75 μm, Nippon Graphite Industries Co., Ltd., Japan)

Hot press: 400 psi, 160☐ for 30 min.
Specimen size: outer Ø25× inner Ø10× thick 4 mm
Post-curing (before 1$^{st}$ carbonization): 1 ☐/min. from R.T. to 130☐, then 0.5 ☐/min. to 180☐, hold for 0.5 hours.
Densification cycle: 1 ☐/min. from R.T. to 160☐, then 0.5 ☐/min. to 230☐, hold for 2 hours.

Carbonization Heating Rate:
1000 ☐/min. till 1200☐, hold for 3 min.
Graphitization: Ar atmosphere, 4.5 ☐/min., from RT to 2200☐, hold for 60 min.
Graphitization furnace: Model No.: S45-20x24-G-G-D6A6-C-25, Centorr Vacuum Industries, USA.
Densification cycle: Resin (PF-650) re-impregnation in vacuum→solvent removal→curing at 160☐ for 30 min.→post curing→carbonization Sample Process Stage: G2

Measurements
Density and Porosity: Determined using water saturation method according to ASTM C830 standard.
Weight: Measured by a HF-300 Multi-Function Balance (A&D Company, Limited, Japan)
Coefficient of friction (COF) and weight loss: Methods as described in Experimental description of Example 5.

TABLE 7-1

Effect of matrix and additive on wear rate and friction coefficient.
Constant velocity wear test: 1000 rpm, 0.8 MPa, 2 min

|  | Bulk density (g/ml) | Porosity (Vol %) | Average COF | Weight loss (g/test) |
|---|---|---|---|---|
| Liquid resin | 1.51 ± 0.016 | 12.25 ± 4.39 | 0.303 | 0.1333 |
| Liquid resin with 5 vol % carbon black | 1.51 ± 0.030 | 8.82 ± 0.59 | 0.350 | 0.1326 |
| Powdered resin | 1.48 ± 0.015 | 9.44 ± 1.24 | 0.329 | 0.0301 |
| Powdered resin with 5 vol % carbon black | 1.48 ± 0.018 | 10.66 ± 1.68 | 0.431 | 0.0141 |
| Powdered resin with 10 vol % carbon black | 1.49 ± 0.021 | 10.49 ± 1.23 | 0.307 | 0.0297 |
| Powdered resin with 5 vol % graphite powder | 1.47 ± 0.011 | 9.36 ± 1.02 | 0.257 | 0.0181 |
| Powdered resin with 10 vol % graphite powder | 1.52 ± 0.040 | 9.44 ± 1.24 | 0.369 | 0.0126 |

Comparing the wear rate of the two matrix system, powdered novolac-type phenolic resin based C/C showed a lower wear rate. With the addition of carbon black and graphite powder, the powdered novolac-type phenolic resin based C/C showed a further decrease in wear rate. These results indicate that with appropriate combination of matrix and additive, the tribological performance of fast-carbonized C/C composite can be improved.

Example 8

Effect of a Post-Treatment on Tribological Behavior of PAN/CVI and Pitch/Phenolic/CVI-Based C/C Composites The purpose of this example is to verify whether the post-treatment in Example 6 is also capable of improving the tribological performance, especially reducing wear rate, of two other 2D C/C formulae, polyacrylonitrile (PAN)-based carbon fiber (fabric laminates)-reinforced chemical vapor infiltrated (CVI) matrix composite, abbreviated as PAN/CVI, and mesophase pitch-based carbon fiber (chopped yarns)-reinforced phenolic resin char-CVI hybrid matrix composite, abbreviated as pitch/phenolic/CVI, which are among the most-popularly-used C/C composites for aircraft brake disk today. Preparation methods and properties of the pitch/phenolic/CVI (designated "A") and PAN/CVI (designated "B") composites have been described in early studies [S. E. HSU and C. I. CHEN, in "Superalloys, Supercomposites and superceramics" (Academic Press, San Diego, Calif., 1989) 721-744; K. J. Lee, J. H. Chern Lin, C. P. Ju, "Simulated-Stop Tribological Behavior of Pitch-Resin-CVI Carbon-Carbon Composite", Materials Chemistry and Physics, Vol. 49, 217-224, 1997; K. J. Lee, H. H. Kuo J. H. Chern Lin, C. P. Ju, "Effect of Surface Condition on Tribological Behavior of PAN-CVI Based Carbon-Carbon Composite", Materials Chemistry and Physics, Vol. 57, No. 3, 244-252 (January 1999)].

The post-treatment procedures in Example 6 were repeated. The bulk density and open porosity were determined using the same method with Example 1. Coefficient of friction (COF) and weight loss were obtained by the methods described in experimental description of Example 5, except that the pressure was increased from 0.8 MPa to 1.7 MPa. Each test group had six specimens.

Bulk density and open porosity of the composites were measured using a water saturation method according to ASTM C830. As indicated in Table 8.1, all samples increased in density and decreased in porosity after the post-treatment, as expected. The "PM" samples had larger increases in density than "FB" samples due to the higher density of the pitch precursor.

The results of constant-speed friction and wear tests are also shown in Table 8.1.

TABLE 8.1

Density and porosity data of samples used for the study.

| Sample code | C/C formula | Bulk density (g/cm³) | Open porosity (vol %) | Average COF | Weight loss (g/test) |
|---|---|---|---|---|---|
| A | Pitch/Phenolic/CVI | 1.73 | 7.94 | 0.4740 | 0.0035 |
| A-FB | A - Furan/Carbon black | 1.74 | 6.20 | 0.4546 | 0.0019 |
| A-PM | A - Coal tar pitch/Mesophase pitch | 1.80 | 6.86 | 0.5759 | 0.0037 |
| B | PAN/CVI | 1.73 | 12.67 | 0.5149 | 0.0093 |
| B-FB | B - Furan/Carbon black | 1.77 | 11.16 | 0.7223 | 0.0096 |
| B-PM | B - Coal tar pitch/Mesophase pitch | 1.78 | 8.06 | 0.5645 | 0.0046 |

The post-treatment "FB" did not significantly change (according to one-way ANOVA at the 0.05 level) the average COF value of sample A (from 0.47 to 0.45), but largely increased the average COF of sample B (from 0.51 to 0.72). On the other hand, the post-treatment "PM" increased the average COF value of sample A (from 0.47 to 0.58) but did not change much the COF of sample B (from 0.51 to 0.56). As demonstrated in Table 8.1, after "FB" treatment, the average weight loss (g/test, of last three tests) of sample A largely decreased from 0.0035 to 0.0019 (by 45.7%). After "PM" treatment, the weight loss of sample B also largely decreased from 0.0093 to 0.0046 (by 50.5%)

This example has demonstrated that a proper post-treatment can stabilize the COF and largely reduce the wear rates of PAN/CVI and pitch/phenolic/CVI-based C/C composites. The mechanism which causes these effects is not clear, but it may result from differences in the process of wear debris generation and the tribological behavior of the wear surface. Nevertheless, from a practical point of view, the present invention has suggested a fairly simple approach to not only stabilize COF, but also effectively cut down by nearly half the wear rates without changing much the COF values of two major C/C formulae used as aircraft brake disk today.

The C/C composites prepared in accordance with the methods of the present invention are useful as a friction material such as an aircraft brake disk, racing car brake disk and clutch, high-speed train braking system; useful in an aviation industry such as heat insulation material used in the aircraft's and rocket's outside surface and in the jet engine and rocket motor; useful as a refractory material such as hot-pressing mold, mold for blow molding metal articles, crucible, electric resistance type heating element, high-temperature and acid resistant bolts and nuts, and conduit and mold for making glass and crystal; useful as an anti-corrosion container, pipe, stirrer and filter in chemical industry; and useful as a biomedical material such as artificial joint and bone.

CITED REFERENCES

1. Chang W C, Ma C C M, Tai N H, Chen C B. Effect of processing methods and parameters on the mechanical properties and microstructure of carbon/carbon composites. Journal of Material Science 1994; 29:5859-5867.
4. Gupta A, Harrison I R. Small-angle X-ray scattering (SAXS) in carbonized phenolic resins. Carbon 1994; 32(5):953-960.
6. Hager J W, Newman J W, Johannes N, Turrill F H. Carbon artifacts and compositions and processes for their manufacture. U.S. Pat. No. 6,013,371, 2000.
8. Ko T H and Chen P C. Study of the pyrolysis of phenolic resin reinforced with two-dimensional plain-woven carbon fabric. Journal of materials science letters 1991; 10: 301-303.
9. Laušević Z, Marinković S. Mechanical properties and chemistry of carbonization of phenol formaldehyde resin. Carbon 1986; 24(5):575-580.
11. Lewis I C, Howard R A. Carbon-carbon composites containing poorly graphitizing pitch as a binder and/or impregnant having a reduced coefficient of thermal expansion and improved flexural strength. U.S. Pat. No. 5,607,770, 1997.
12. Lewis I C, Chemistry of carbonization. Carbon 1982; 20(6):519-529.
15. Murdie N, Parker C A, Pigford J F, Narasimhan D, Dillon F. Process of making carbon-carbon composite material made from densified carbon foam. U.S. Pat. No. 6,077,464, 2000.
17. Nam J D, Seferis J C. Initial polymer degradation as a process in the manufacture of carbon-carbon composites. Carbon 1992; 30(5):751-761.
18. Olsen R E, Reese H F, Backlund S J. Process for forming carbon-carbon composite. U.S. Pat. No. 5,686,027, 1997.
19. Prevorsek D C, Li H L. Carbon fiber-reinforced carbon composite material. U.S. Pat. No. 5,556,704, 1996.
20. Roy A K. Effect of carbonization rates on the interlaminar tensile stiffness and strength of two-dimensional carbon-carbon composites. AD-Vol. 34/AMD-Vol. 173, Thermomechanical Behavior of Advanced Structural Materials, ASME 1993.
21. Sastri S B, Armistead J P, Keller T M. Carbon-based composites derived from phthalonitrile resins. U.S. Pat. No. 5,965,268, 1999.

The invention claimed is:

1. A method for preparing a carbon/carbon (C/C) composite comprising carbonizing a carbon fiber-reinforced polymer matrix composite precursor by heating the precursor in an inert atmosphere with a furnace at a temperature of 500-2000° C. with a heating rate greater than 20° C./min, wherein said precursor is heated without an exterior pressure being applied to said precursor.

2. The method as set forth in claim 1, wherein the heating rate is greater than 100° C./min.

3. The method as set forth in claim 1, wherein the heating rate is of 300-1500° C./min.

4. The method as set forth in claim 2 wherein the heating is carried out by using an open-end induction furnace, and wherein said precursor is continually or intermittently brought in and out said furnace.

5. The method as set forth in claim 2, wherein the precursor is a cured carbon fiber-reinforced polymer matrix composite having a thickness less than 3.0 cm.

6. The method as set forth in claim 5, wherein the precursor is a cured carbon fiber-reinforced polymer matrix composite having a thickness less than 2.0 cm.

7. The method as set forth in claim 5, wherein the precursor is a cured carbon fiber-reinforced polymer matrix composite prepared from randomly oriented carbon fibers having a length greater than 3.0 mm and shorter than a length of the precursor.

8. The method as set forth in claim 7, wherein the randomly oriented carbon fibers having a length shorter than 30% of the length of the precursor.

9. The method as set forth in claim 5, wherein the precursor is a cured carbon fiber-reinforced polymer matrix composite prepared from a two-dimensional woven carbon fiber cloth, two-dimensional random fiber mat or a three-dimensional woven fiber preform.

10. The method as set forth in claim 5, wherein the precursor is a cured carbon fiber-reinforced polymer matrix having 20-80 vol % of carbon fibers based on the volume of the cured carbon fiber-reinforced polymer matrix.

11. The method as set forth in claim 10, wherein the cured carbon fiber-reinforced polymer matrix has 30-70 vol % of carbon fibers.

12. The method as set forth in claim 1 further comprising a first graphitization comprising heating the resulting carbonized composite in an inert atmosphere at a temperature higher than 2000° C.

13. The method as set forth in claim 12 further comprising densifying the resulting first graphitized composite by repeating one or more cycles of impregnating the first graphitized composite with a resin; curing the resin; and carbonizing the cured resin in the first graphitized composite.

14. The method as set forth in claim 1 further comprising densifying the resulting carbonized composite by repeating one or more cycles of impregnating the carbonized composite with a resin; curing the resin; and carbonizing the cured resin in the carbonized composite.

15. The method as set forth in claim 13 further comprising a second graphitization comprising heating the resulting densified composite in an inert atmosphere at a temperature higher than 2000° C.

16. The method as set forth in claim 15 further comprising subjecting the resulting second graphitized composite to a post-treatment comprising impregnating the second graphitized composite with a resin; curing the resin; carbonizing the cured resin in the second graphitized composite; and optionally graphitizing the carbonized second graphitized composite at a temperature higher than 2000° C.

17. The method as set forth in claim 14, wherein said carbonizing in said densifying is carried out in an inert atmosphere and with a heating rate greater than 20° C./min.

18. The method as set forth in claim 16, wherein said carbonizing in said post-treatment is carried out in an inert atmosphere and with a heating rate greater than 20° C./min.

19. The method as set forth in claim 1, wherein said carbon fiber is selected from the group consisting of polyacrylonitrile (PAN)-derived carbon fiber, pitch-derived carbon fiber and rayon-derived carbon fiber.

20. The method as set forth in claim 1, wherein said polymer is a thermosetting polymer or a thermoplastic polymer.

21. The method as set forth in claim 20, wherein said thermosetting polymer is selected from the group consisting of phenolic resin, furfural alcohol resin and polyimide.

22. The method as set forth in claim 20, wherein said thermoplastic polymer is selected from the group consisting of petroleum pitch, coal tar pitch, mesophase pitch and polyetheretherketone (PEEK).

23. The method as set forth in claim 1, wherein said polymer is doped with a carbon-containing viscosity-modifying component selected from the group consisting of graphite, carbon black, mesophase pitch, carbon nanoparticle, carbon nanotube, and carbide.

24. The method as set forth in claim 16, wherein said resin used in said post-treatment is a phenolic resin, a furfural alcohol resin, a petroleum pitch, a coal tar pitch or a mesophase pitch.

25. The method as set forth in claim 14, wherein said resin used in said densifying is doped with a carbon-containing additive.

26. The method as set forth in claim 25, wherein said carbon-containing additive is in an amount of 1-30% based on the weight of the resin.

27. The method as set forth in claim 25, wherein said carbon-containing additive is selected from the group consisting of graphite, carbon black, mesophase pitch, carbon nanoparticle, carbon nanotube, and carbide.

28. The method as set forth in claim 16, wherein said resin used in said post-treatment is doped with a carbon-containing additive.

29. The method as set forth in claim 28, wherein said carbon-containing additive is in an amount of 1-30% based on the weight of the resin.

30. The method as set forth in claim 28, wherein said carbon-containing additive is selected from the group consisting of graphite, carbon black, mesophase pitch, carbon nanoparticle, carbon nanotube, and carbide.

31. The method as set forth in claim 14, wherein said carbonizing in said densifying is carried out in an inert atmosphere and with a heating rate greater than 100° C./min.

32. The method as set forth in claim 16, wherein said carbonizing in said post-treatment is carried out in an inert atmosphere and with a heating rate greater than 100° C./min.

33. The method as set forth in claim 1, wherein the heating is not resistive heating.

34. The method as set forth in claim 1, wherein the heating does not require applying an electric current to the precursor.

* * * * *

UNITED STATES PATENT AND TRADEMARK OFFICE
CERTIFICATE OF CORRECTION

| | | |
|---|---|---|
| PATENT NO. | : 7,871,592 B2 | Page 1 of 1 |
| APPLICATION NO. | : 11/794102 | |
| DATED | : January 18, 2011 | |
| INVENTOR(S) | : Jiin-Huey Chern Lin et al. | |

It is certified that error appears in the above-identified patent and that said Letters Patent is hereby corrected as shown below:

On the title page item (73), should read:

Assignee: Jiin-Huey Chern Lin (US)
-- Chien-Ping JU (US) --

Signed and Sealed this
Twenty-fifth Day of October, 2011

David J. Kappos
*Director of the United States Patent and Trademark Office*